United States Patent
Fast

(10) Patent No.: US 9,616,487 B2
(45) Date of Patent: Apr. 11, 2017

(54) RIVETING TOOL

(71) Applicant: Sikorsky Aircraft Corporation, Stratford, CT (US)

(72) Inventor: Edward E. Fast, Stratford, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 539 days.

(21) Appl. No.: 13/752,760

(22) Filed: Jan. 29, 2013

(65) Prior Publication Data

US 2014/0208573 A1    Jul. 31, 2014

(51) Int. Cl.
| | |
|---|---|
| *B21J 15/02* | (2006.01) |
| *B23P 11/00* | (2006.01) |
| *B21J 15/10* | (2006.01) |
| *B23P 19/06* | (2006.01) |
| *F16B 37/06* | (2006.01) |

(52) U.S. Cl.
CPC .............. *B21J 15/10* (2013.01); *B21J 15/02* (2013.01); *B23P 19/06* (2013.01); *F16B 37/064* (2013.01); *Y10T 29/4992* (2015.01); *Y10T 29/49954* (2015.01); *Y10T 29/49956* (2015.01); *Y10T 29/5118* (2015.01); *Y10T 29/5377* (2015.01)

(58) Field of Classification Search
CPC . B21J 15/10; B21J 15/105; B21J 15/14; B21J 15/142; B21J 15/30; B21J 15/32; B21J 15/36; B21J 15/40; B21J 15/02; B21J 15/022; B21J 15/025; B21J 15/04; B21J 15/041; Y10T 29/5118; Y10T 29/5377; Y10T 29/49954; Y10T 29/49956; Y10T 29/5393; B23P 19/06; B23P 19/062; B23P 19/063; B23P 19/064

USPC .......................... 227/56, 62, 61, 51
See application file for complete search history.

(56) References Cited

U.S. PATENT DOCUMENTS

| | | | |
|---|---|---|---|
| 333,780 A | | 1/1886 | Pederson |
| 2,460,930 A | * | 2/1949 | Gookin ........................ 227/16 |
| 2,782,855 A | * | 2/1957 | Marcoux ............. B21D 28/002 30/360 |
| 2,835,150 A | * | 5/1958 | Marcoux ................. B21J 15/18 72/313 |
| 3,518,745 A | * | 7/1970 | Gray et al. ...................... 29/271 |
| 3,646,660 A | * | 3/1972 | Sheffer, Jr. ................ 29/243.53 |
| 3,729,801 A | * | 5/1973 | Gregory .................... 29/243.53 |
| 3,729,809 A | | 5/1973 | Vawter et al. |
| 3,802,053 A | * | 4/1974 | Wheeler .................... 29/243.54 |
| 3,802,060 A | * | 4/1974 | Gross .............................. 29/464 |

(Continued)

FOREIGN PATENT DOCUMENTS

JP          04327334 A    * 11/1992

*Primary Examiner* — Essama Omgba
(74) *Attorney, Agent, or Firm* — Cantor Colburn LLP

(57) ABSTRACT

A riveting tool configured to install a plurality of fasteners simultaneously is provided including a body having a generally central cavity. A strike surface is arranged at a first end of the body and a plurality of contactors extends generally outwards from a second, opposite end of the body. Each contactor includes an engagement surface configured to contact a surface of an adjacent fastener when a force is applied to the strike surface. A biasing mechanism is arranged within the cavity adjacent an upper cavity surface. A dowel is positioned within the cavity adjacent the biasing mechanism. The dowel is configured to engage a portion of an adjacent nut plate and translate within the cavity.

9 Claims, 3 Drawing Sheets

(56) References Cited

U.S. PATENT DOCUMENTS

| | | | |
|---|---|---|---|
| 4,578,846 A * | 4/1986 | Schott et al. | 29/34 B |
| 4,930,206 A * | 6/1990 | Suzuki et al. | 29/525.06 |
| 5,214,837 A * | 6/1993 | Stafford | 29/525.06 |
| 5,332,349 A | 7/1994 | Gerwin | |
| 5,685,058 A | 11/1997 | Givler | |
| 6,295,710 B1 | 10/2001 | Roberts et al. | |
| 6,421,900 B1 * | 7/2002 | Hunt | B21J 15/10 269/3 |

* cited by examiner

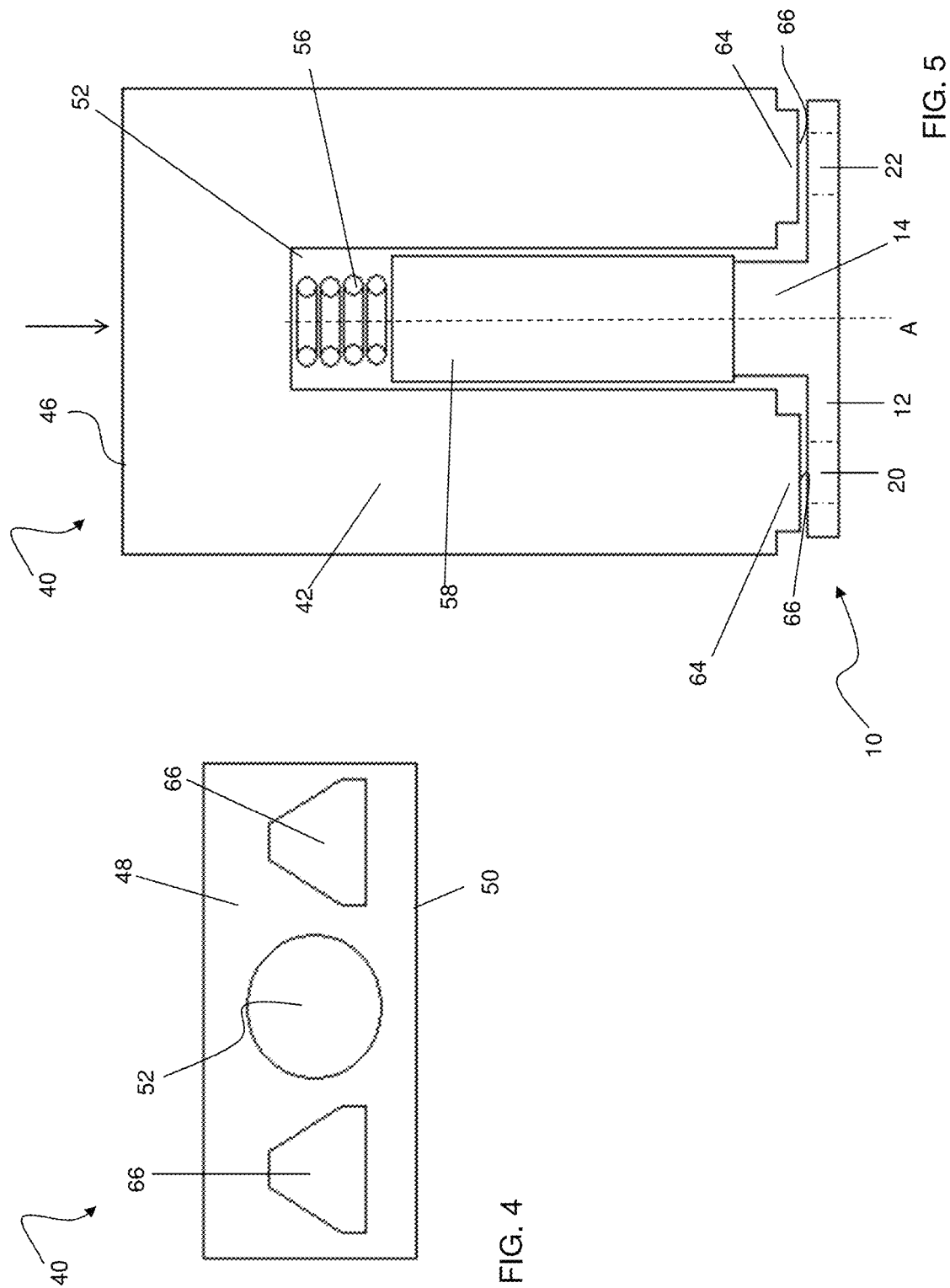

RIVETING TOOL

BACKGROUND OF THE INVENTION

This invention was made with Government support under Agreement W58RGZ-08-C-0003 awarded by the Department of the Army. The Government has certain rights in the invention.

BACKGROUND OF THE INVENTION

This invention relates to rotary wing aircrafts and, more particularly, to an access panel on a fuselage of a rotary wing aircraft.

A nut plate is a small plate to which a fastener nut is secured. It is used in aircrafts on walls which do not permit the use of a tapped opening. The nut plate typically includes a pair of fastener openings spaced diametrically apart on opposite sides of the nut. Openings matching the fastener openings in the nut plate are formed in a wall to which the nut plate is secured. The nut plate is positioned on the wall with its fastener openings in alignment with the openings that were formed in the wall. Then rivets or other suitable fasteners are inserted intra the aligned openings and secured in place to in turn secure the nut plate to the wall.

The rivets are generally secure place one at a time using a punch tool. The compression created when the first rivet of the nut plate is secured may cause the second end of the nut plate to lift from the wall such that a gap exists between the second end of the nut plate and the surface of the wall. As a result, vibrations may cause the nut plate to separate from the wall over time.

BRIEF DESCRIPTION OF THE INVENTION

According to one embodiment of the invention, a riveting tool configured to install a plurality of fasteners simultaneously is provided including a body having a generally central cavity. A strike surface is arranged at a first end of the body and a plurality of contactors extends generally outwards from a second, opposite end of the body. Each contactor includes an engagement surface configured to contact a surface of an adjacent fastener when a force is applied to the strike surface. A biasing mechanism is arranged within the cavity adjacent an upper cavity surface. A dowel is positioned within the cavity adjacent the biasing mechanism. The dowel is configured to engage a portion of an adjacent nut plate and translate within the cavity.

According to another embodiment of the invention, a method for simultaneously installing a plurality of fasteners on a nut plate is provided including aligning a nut plate having a first fastener arranged in a first through hole and a second fastener arranged in a second through hole against an adjacent surface. The riveting tool is positioned adjacent the nut plate such that a dowel arranged generally within a cavity of the riveting tool is in contact with a portion of the nut plate. A force is applied to a strike surface of the riveting too to punch the first and second fasteners simultaneously.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 4 is a bottom view of a riveting tool according to an embodiment of the present invention; and FIG. 5 is side view of an aligned riveting tool and nut plate according to an embodiment of the present invention.

The detailed description explains embodiments of the invention, together with advantages and features, by way of example with reference to the drawings.

DETAILED DESCRIPTION OF THE INVENTION

Figure 1:
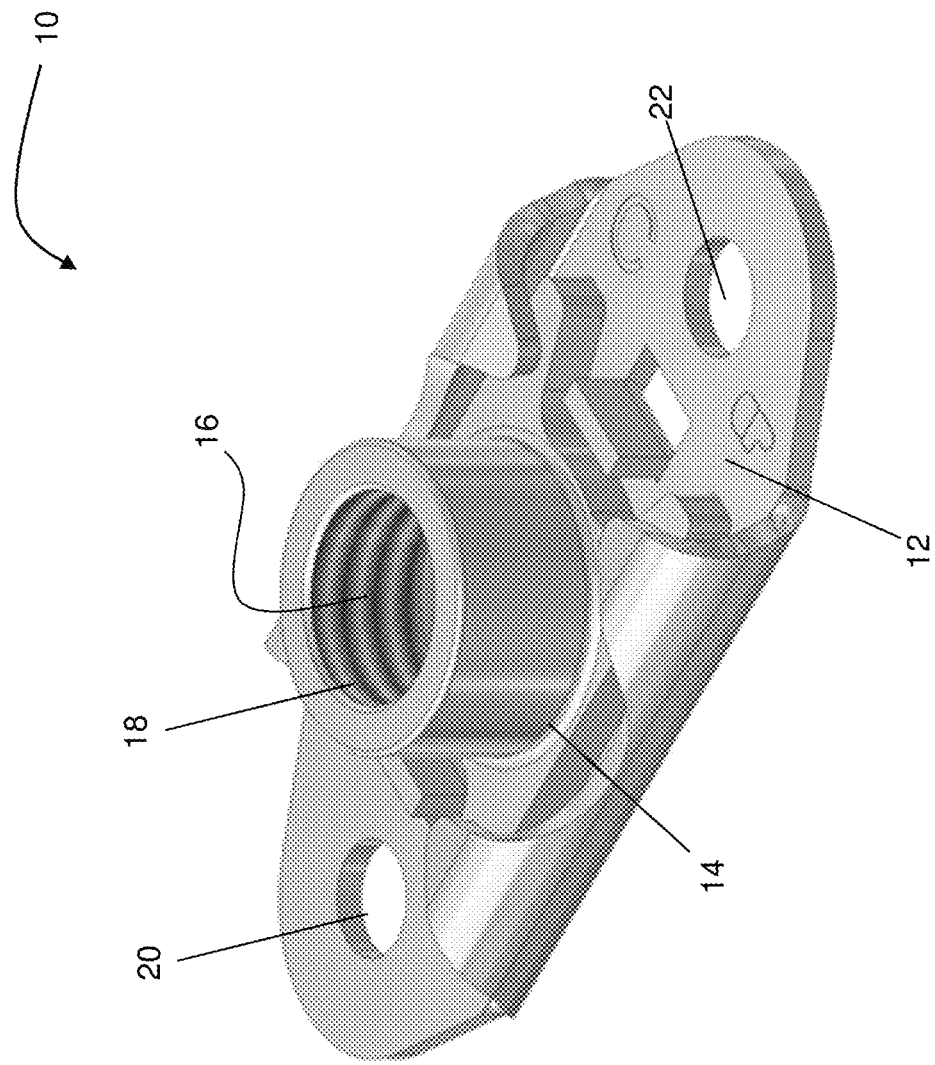
FIG. 1 is a perspective view of an exemplary nut plate for use with the present invention.
Figure 3:
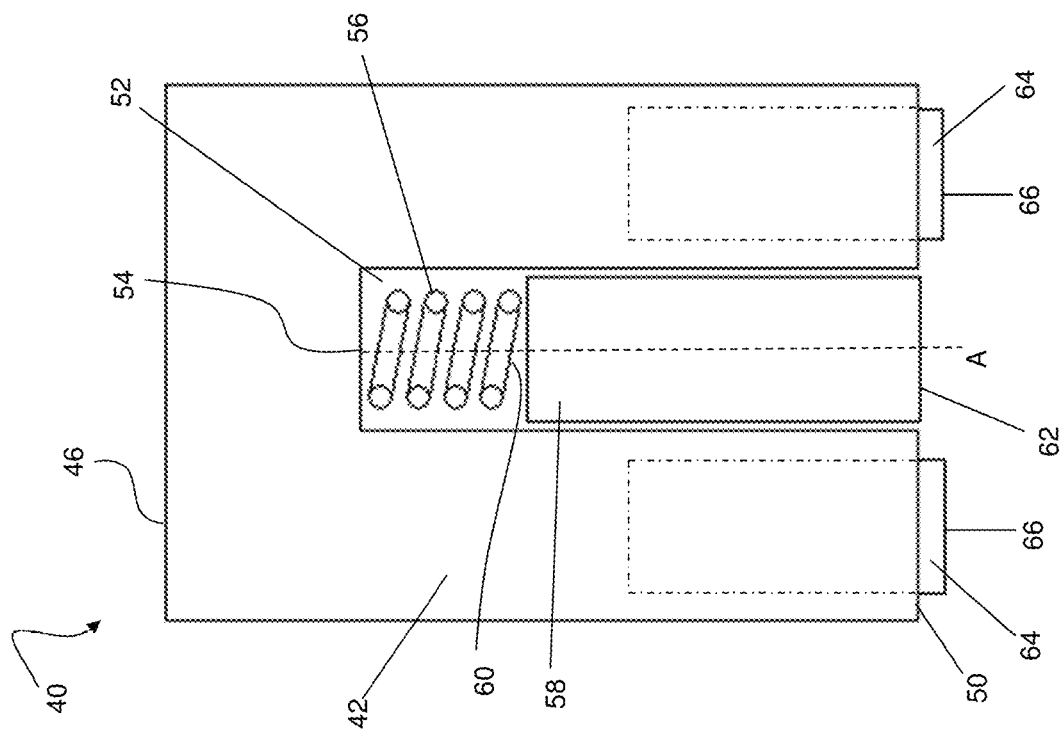
FIG. 3 is a side view of a riveting tool according to an embodiment of the present invention.
Figure 2:
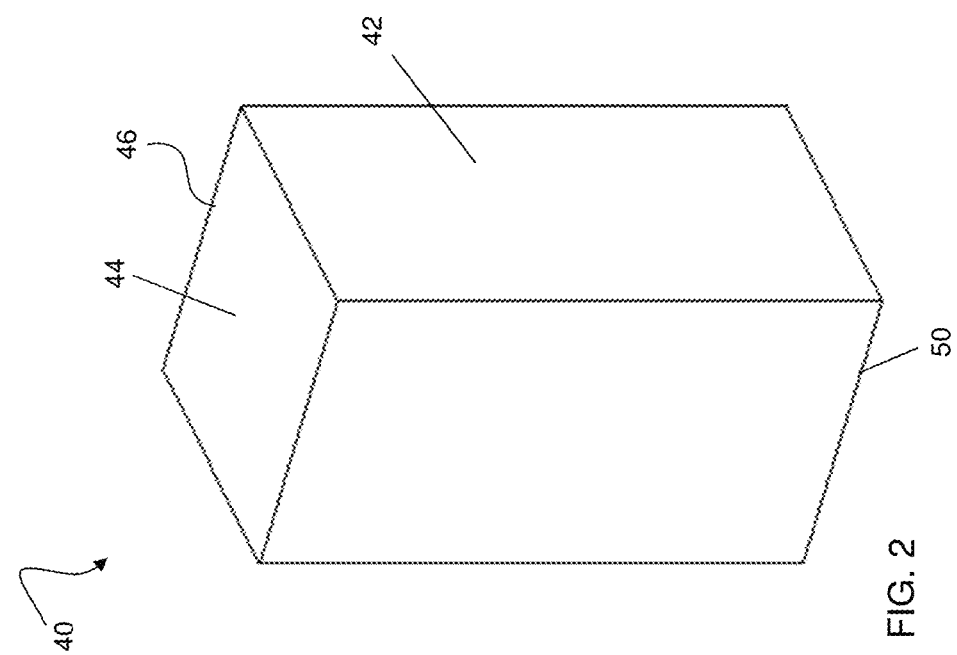
FIG. 2 is a perspective view of a riveting tool according to an embodiment of the present invention.

Referring now to FIG. 1, an exemplary nut plate 10 is illustrated. The nut plate 10 includes a generally planar base plate 12 and a nut 14 mounted on the base plate 12 and movable only in a first direction relative thereto. The nut 14 includes a central opening 16 having a plurality of threads 18 arranged about the periphery thereof. The base plate 12 includes a first through hole 20 and a second through hole 22 formed at predetermined positions on opposing sides of the nut 14. The exemplary nut plate 10 is configured to attach to a surface (not shown), such as an access panel of a rotary wing aircraft for example, by driving a rivet (not shown) through each of the through holes 20, 22 in the base plate 12 and into the adjacent surface.

Referring now to the FIGS. 2-5 a cross-section of a riveting tool 40 configured to stamp a plurality of rivets simultaneously is illustrated. The riveting tool 40 includes a generally rectangular body 42 formed from a metal material, such as shock steel for example. A strike surface 44, arranged at a first end 46 of the body 42 is substantially flat, and parallel to the surface 48 at the second, opposite end 50 of the body 42. In one embodiment, at least a portion of the body 42 of the riveting tool 40, for example the strike surface, is heat-treated to improve the strength and durability of the tool 40. Arranged generally centrally within the body 42 is a substantially hollow cavity 52. Though the cavity 52 is depicted in the Figures as extending only partially through the depth of the body 42, configurations that include a cavity 52 extending through the entire depth of the body 42 are within the scope of the invention. The cross-section of the cavity 52 is substantially constant over the length of the cavity 52 and is generally large enough to receive the nut 14 of a corresponding nut plate 10 (see FIG. 1).

Housed within the cavity 52 adjacent an upper cavity surface 54 is a biasing mechanism 56, such as a coil spring for example. In one embodiment, the biasing mechanism 56 is fixed to the upper cavity surface 54 to prevent movement of the biasing mechanism 56 relative to the cavity 52. In addition, the diameter of the biasing mechanism 56 may be generally equal to the diameter of the cavity 52 to retain the biasing mechanism 56 in a substantially aligned orientation with the longitudinal axis A of the cavity 52.

A dowel or spacer 58 configured to move relative to the cavity 52 is arranged adjacent the second end 60 of the biasing mechanism 56, within the cavity 52. The dowel 58 may be coupled to the biasing mechanism 56 to retain the dowel 58 within the cavity 52. In one embodiment, the diameter of the dowel 58 is substantially equal to the diameter of the cavity 52 to prevent dust and other debris from entering the cavity 52. The free end 62 of the dowel 58 is configured to contact the nut 14 of an adjacent nut plate 10 and apply a force thereto (see FIG. 5). In one embodiment, the free end 62 of the dowel 58 may be received within the opening 16 of the nut 14. Alternatively, the free end 62 of the dowel 58 may include a plurality of threads (not shown) configured to mate with the threads 18 of the nut 14.

Extending outwardly from the second end 50 of the body 42 are multiple contactors 64, for example two, each of which has an engagement surface 66 configured to contact and deform an adjacent rivet. In the illustrated non-limiting embodiment, the contactors 64 are formed as separate, column-like components that are positioned within complementary holes in the body 42. In another embodiment, the contactors 64 may be integrally formed with the body 42, such as by machining the second end 50 of the body 42 for example. The surface area of the engagement surfaces 66 may be generally equal to or larger than the surface area of the adjacent rivets. The engagement surfaces 66 of the contactors 64 may be any shape, including but not limited to round, oval, square, triangular, or polygonal for example. In one embodiment, illustrated in FIG. 4, the engagement surfaces 64 are a six-sided polygonal shape, similar to a triangle that had its corners removed.

Referring now to FIG. 5, the riveting tool 40 is illustrated adjacent a nut plate 10. When the dowel 58 of the riveting tool 40 is generally aligned with the nut 14, the contactors 64 extending from the body 42 of the riveting tool 40 are substantially aligned with the plurality of rivets arranged within the first through hole 20 and the second through hole 22 in the nut plate 10. Engagement between the dowel 58 and the nut 14 causes the dowel 58 to translate within the cavity 52, thereby compressing the biasing mechanism 56. As a result, the biasing force of the compressed biasing mechanism 56 is transmitted securing the nut plate 10 in place against an adjacent surface.

To mount the nut plate 10 to an adjacent surface, a force is applied, such as with a hammer or pneumatic tool for example, to the strike surface 44 of the riveting tool 40. The force causes further compression of the biasing mechanism 56 and the engagement surfaces 66 to strike a portion, such as a head for example, of an adjacent rivet, causing the rivet to deform within a respective through hole 20, 22 in the nut plate 10.

Use of the riveting tool 40 to secure nut plates 10 to an adjacent surface reduces the likelihood of a gap forming between the surface and a portion of the nut plate 10 during installation. Because the possibility of improperly aligning the riveting tool 40 with the nut plate 10 is limited, the accuracy and efficiency of the installation process is improved. In addition, the reduction in installation time and material results in an overall cost savings.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A riveting tool configured to install a plurality of fasteners simultaneously comprising:
   a body having a generally central cavity, wherein a strike surface, configured for application of a force thereto by a hammering tool, is arranged at a first end of the body, and a plurality of contactors extend generally outwardly from a second, opposite end of the body, each contactor includes an engagement surface configured to contact a surface of an adjacent fastener when the force is applied to the strike surface, the strike surface being substantially parallel to the engagement surface;
   a biasing mechanism arranged within the cavity adjacent an upper cavity surface; and
   a dowel positioned within the cavity adjacent to the biasing mechanism, the dowel is positionable within a nut of an adjacent nut plate and translates within the cavity, wherein when the force is applied to the strike surface, the biasing mechanism compresses such that each of the biasing mechanism, the dowel, and the nut are received within the cavity.

2. The riveting tool according to claim 1, wherein the body is generally rectangular.

3. The riveting tool according to claim 1, wherein the body is formed from a metal material.

4. The riveting tool according to claim 1, wherein the strike surface is heat treated.

5. The riveting tool according to claim 1, wherein the plurality of contactors are separate column-like components arranged within a complementary hole in the body.

6. The riveting tool according to claim 1, wherein the plurality of contactors are integrally formed with the body.

7. The riveting tool according to claim 1, wherein the engagement surfaces of the plurality of contactors are generally a six sided polygonal shape.

8. The riveting tool according to claim 1, wherein the biasing mechanism is a coil spring.

9. The riveting tool according to claim 1, wherein the cavity extends through only a portion of a depth of the body.

* * * * *